United States Patent [19]

Hazard et al.

[11] Patent Number: 4,907,272

[45] Date of Patent: Mar. 6, 1990

[54] METHOD FOR AUTHENTICATING AN EXTERNAL AUTHORIZING DATUM BY A PORTABLE OBJECT, SUCH AS A MEMORY CARD

[75] Inventors: Michel Hazard, Mareil/Mauldre; Michel Ugon, Maurepas, both of France

[73] Assignee: Bull CP8, Trappes, France

[21] Appl. No.: 171,430

[22] PCT Filed: Jul. 9, 1987

[86] PCT No.: PCT/FR87/00272

§ 371 Date: Mar. 10, 1988

§ 102(e) Date: Mar. 10, 1988

[87] PCT Pub. No.: WO88/00743

PCT Pub. Date: Jan. 28, 1988

[30] Foreign Application Priority Data

Jul. 11, 1986 [FR] France ................................ 86 10209

[51] Int. Cl.$^4$ .................................................. H04L 9/00
[52] U.S. Cl. ......................................... 380/23; 380/24; 380/25
[58] Field of Search ..................................... 380/23–25

[56] References Cited

U.S. PATENT DOCUMENTS

| | | | |
|---|---|---|---|
| 4,211,919 | 7/1980 | Ugon | 380/23 |
| 4,453,074 | 6/1984 | Weinstein | 380/23 |
| 4,465,901 | 8/1984 | Best | 380/49 |
| 4,467,139 | 8/1984 | Mollier | 380/23 |
| 4,471,216 | 9/1984 | Herve | 380/23 |
| 4,549,075 | 10/1985 | Saada et al. | 380/25 |
| 4,638,120 | 1/1987 | Herve | 380/25 |
| 4,656,474 | 4/1987 | Mollier et al. | 380/23 |
| 4,683,553 | 7/1987 | Mollier | 380/25 |
| 4,731,841 | 3/1988 | Rosen et al. | 380/23 |
| 4,764,959 | 8/1988 | Watanabe | 380/25 |
| 4,799,258 | 1/1989 | Davies | 380/23 |

FOREIGN PATENT DOCUMENTS

| | | |
|---|---|---|
| 0028965 | 5/1981 | European Pat. Off. . |
| 0096599 | 12/1983 | European Pat. Off. . |
| 0114773 | 8/1984 | European Pat. Off. . |
| 8504299 | 9/1985 | PCT Int'l Appl. . |

Primary Examiner—Salvatore Cangialosi
Attorney, Agent, or Firm—Kerkam, Stowell, Kondracki & Clarke

[57] ABSTRACT

The invention relates to a method for authenticating an external authorizing datum by a portable object, such as a memory card.

The authorizing datum (C1) entered into an apparatus (2) is enciphered with a predetermined datum (E) to yield a message (M) which is transmitted to a portable object (1). The object (1) deciphers the message (M), taking into account a reference authorizing datum (C1), in order to retrieve a datum (E'), which must be coherent with the datum (E).

The invention applies in particular to the recognition of the carrier code of the owner of a credit card.

20 Claims, 2 Drawing Sheets

METHOD FOR AUTHENTICATING AN EXTERNAL AUTHORIZING DATUM BY A PORTABLE OBJECT, SUCH AS A MEMORY CARD

The invention relates to a method for authenticating an external authorizing datum by a portable object, such as a memory card.

The invention applies in particular to authenticating a confidential code assigned to the owner of a memory card.

In the majority of applications that use a memory card, each owner of a card is assigned a confidential code by an authorized entity. This code, which is particular to the owner and personalizes his card, is prerecorded in the memory of the card. The authorized entity also records data or parameters in this memory that define the limits of use of the card, in particular the services that can be obtained by means of this card.

The owner gains access to these services by way of apparatuses with which he temporarily couples his card. These apparatuses generally do not begin the process of furnishing the service requested until after controls, intended in particular to assure that the carrier of the card is indeed the owner of it, and that the card is indeed authorized to furnish the service requested. Although these controls may vary from service to another, there is one of them that is always performed on the confidential code. More precisely, the carrier of the card enters his code into the apparatus, for example by way of a keyboard; the code entered is then transmitted to the card to be compared with the code prerecorded in its memory. In the event that the codes are the same, the process of furnishing the service continues, and in case they are not the same, the process of furnishing the service requested is automatically broken off. This control makes it possible to avoid use of the card by any person other than its owner.

However, a defrauder in possession of a stolen card has the chance to make a great number of attempts until he finds the valid code that corresponds to the code prerecorded in the memory of the card. To overcome this kind of attempted fraud, an error counter is provided in the card, which is incremented each time an erroneous code is presented. As soon as this counter attains a predetermined number, the card is automatically rendered unusable, as is described in U.S. Pat. No. 4,092,524, corresponding to French Patent No. 2 311 360.

This first improvement proves to be inadequate if the defrauder is able to prevent or inhibit the memorization function of the counter, by cutting the power supply of the card at the precise instant when the counter must be incremented. This instant can be detected by analysis of the signals exchanged between the card and the apparatus. In fact, it is sufficient for the defrauder to locate the signals transmitted by the apparatus that correspond to the writing voltage sent to the card to enable it to write into the error counter.

A second improvement, described in U.S. Pat. No. 4,211,919, corresponding to the French Patent No. 2 401 459 of the present applicant, makes it possible to avoid this kind of fraud by providing an identical processing method whether the code presented is valid or invalid. In fact, knowing that the defrauder can locate the instant when the apparatus transmits the writing voltage to the card and that this voltage is not transmitted except in the case where the code presented to the card is invalid, the improvement comprises also transmitting a writing voltage to the card even if the code presented is valid. Thus a symmetry in the processing time for a valid code or an erroneous code is attained, so that a defrauder cannot gain any advantage from a difference between these processing times.

Nevertheless, this symmetry of the processing times is a constraint for the programmer, and in practice it proves to be very difficult to put this constraint into effect.

According to the method of the invention, recognition of an external authorizing datum is not performed by simple comparison between this datum and the reference authorizing datum recorded in the card.

The method according to the invention makes it possible to obtain variable times used for the recognition of an authorizing datum, which does not make the task of a defrauder observing the signals exchanged between the card and the apparatus easier.

Accordingly, the invention proposes a method for authentication of an authorizing datum by a portable object such as a memory card including processing circuits, said card being coupled with an apparatus such as an apparatus for furnishing services, characterized in that it comprises:

in the apparatus, fashioning an enciphered massage by application of an enciphering function of an invertible algorithm used by a program recorded in a memory of the apparatus and executed by the processing circuits, this program taking into account at least the authorizing datum and one predetermined datum (E), and transmitting this message to the card;

in the card, applying to the message received the deciphering function of the algorithm by executing a program recorded in the memory of the card and taking into account a reference authorizing datum to yield a datum (E'), and verifying that this datum (E') is coherent with the datum (E).

According to another characteristic of the invention, the datum (E) is calculated on the basis of at least one predetermined result, one fixed or variable parameter assigned to the card, and one secret key, by application of an enciphering function of an invertible algorithm.

According to another characteristic of the invention, the deciphering function of the aforesaid algorithm is applied to the datum (E') calculated by the card, on the basis of the same fixed or variable parameter and the same secret key, to obtain a result which must be coherent with the aforesaid predetermined result.

BRIEF DESCRIPTION OF DRAWINGS

Further characteristics, advantages and details of the method according to the invention will now be described in the ensuing description, made with reference to the appended drawings, in which.

Figure 1:
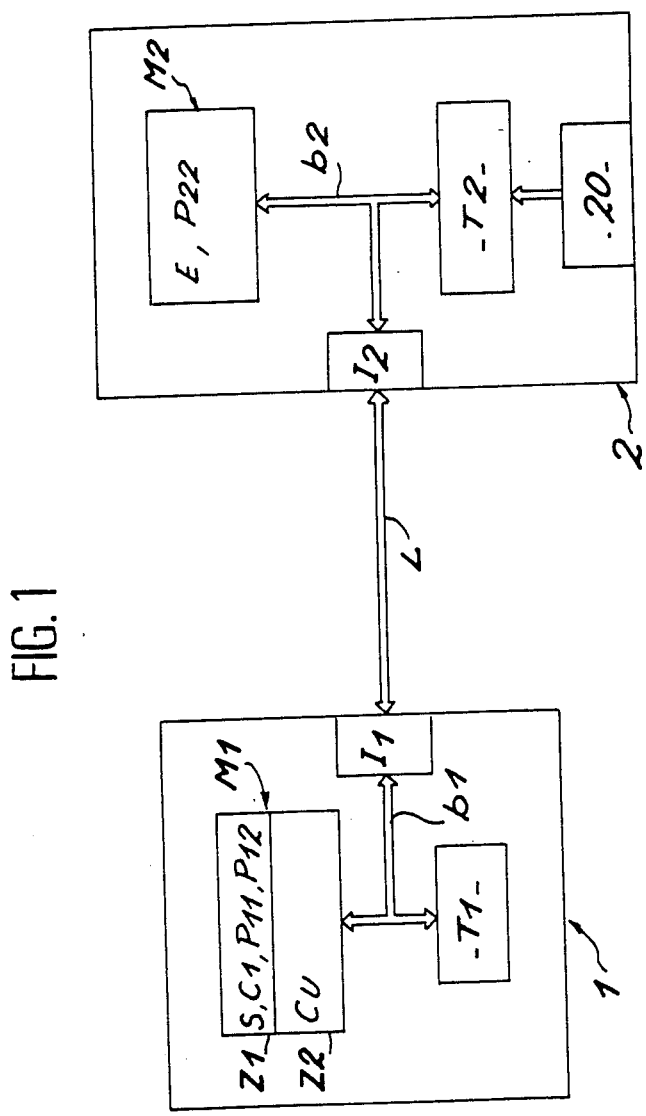
FIG. 1 illustrates the principle of the method in accordance with a first exemplary embodiment.

The figures schematically show the characteristics of a memory card (1) and an apparatus (2) such as an apparatus for furnishing services, which are necessary for the performance of the method according to the invention.

The memory card (1) substantially comprises a memory (M1) and processing circuits (T1), such as a microprocessor. A card of this kind is described in particular in U.S. Pat. Nos. 4,211,919 and 4,382,279, corresponding respectively to the French patent Nos. 2 401 459 and 2 461 301 of the present applicant.

Specifically, the memory (M1) comprises at least two memory zones (Z1, Z2). The memory zone (Z1) is inaccessible for writing and reading from the outside, while the memory zone (Z2) is accessible only for reading from the outside. Contrarily, these zones (Z1, Z2) are freely accessible for reading and writing by the processing circuits (T1).

The memory (M1) and the processing circuits (T1) exchange data by way of a bus (b1), which carries control signals, address signals, and data signals. The bus (b1) is connected to an input/output interface (I1).

The apparatus (2) substantially comprises a memory (M2), processing circuits (T2) such as a microprocessor, and an input device (20), such as a keyboard. The various circuits of the apparatus (2) exchange data among themselves by way of a bus (b2) connected to an input/output interface (I2). It will be understood that the apparatus also includes all the circuits necessary for furnishing the service for which it has been designed.

Coupling of a card (1) with the apparatus (2) is performed by way of the two interfaces (I1, I2), connected with one another via an electrical or optical transmission line (L). By way of example, these two interfaces are of the type described in French Patent No. 2 490 367 of the present applicant, and the interface (I2) of the apparatus (2) may advantageously be equipped with the connector such as described in U.S. Pat. No. 4,443,049 of the present applicant, for removable coupling of the card (1) with the apparatus (2). Finally, the mode of dialogue or transmission of data between the card (1) and the apparatus (2) may advantageously be that described in U.S. Pat. No. 4,556,958 of the present applicant.

The principle of the method according to the invention will now be described, in terms of a first exemplary embodiment described with respect to FIG. 1.

The method can be broken down into two phases. The first phase comprises initializing the card and the apparatus, and the second phase comprises the performance per se of the method for recognition of an authorizing datum, such as the confidential code assigned to the owner of a memory card.

The initializing phase substantially comprises predetermining certain data and recording them, either into the memory (M1) of the card (1), or into the memory (M2) of the apparatus (2).

An authorized entity, that is, the entity responsible for a service that can be furnished via the apparatus (2) upon presentation of a card (1), monitors this initializing phase before issuing a card.

First, the authorized entity predetermines one result (Rk) and one secret key (S). The result (Rk) is broken down into a plurality of fields (Rk1, Rk2, . . . , Rkn) which must meet predetermined conditions or satisfy predetermined equations. By way of example, the predetermined result (Rk) is broken own into three fields (Rk1, Rk2, Rk3), such that:

$$Rk1 = Rk2 = ad\ Cu$$

where (ad Cu) is the address in memory of a word from zone (Z2) of the memory M1 of the card (1), and (Cu) is a parameter common to all the cards that can gain access to the service furnished by the apparatus (2).

The authorized entity then calculates a datum (E) such that:

$$E = f(Rk, S, Cu)$$

where (f) is the non-inverted function of an invertible algorithm (A1), for example such as described in French Patent Application No. 2 566 155 as published. This calculation is performed on any machine known per se that has a memory and appropriate processing circuits, or preferably by the processing circuits of a card similar to the card (1), for the sake of better protection of the function (f) and the secret key (S).

The initializing phase terminates with the recording of data in the memory (M1) of the card (1) and in the memory (M2) of the apparatus (2).

The above-mentioned secret key (S), a program (P11) that is the implementation of the inverse function $(f^{-1})$ of the abovementioned algorithm (A1), a program (P12) which is the implementation of the inverse function $(g^{-1})$ of a second algorithm (A2), the role of which will be explained below, and a confidential code (C1) that will then be assigned to the owner of the card (1) are recorded into the memory zone (Z1) of the memory (M1) of the card (1). The memory zone (Z1) is then locked, to make these data inaccessible from outside, but accessible internally by the processing circuits (T1) of the card (1).

Into the zone (Z2) of the memory (M1) of the card (1), the aforementioned parameter (Cu) is recorded, and the memory zone (Z2) is then locked to prevent writing from the outside.

Into the memory (M2) of the apparatus (2), the datum (E) calculated beforehand and a program (P22) which is the implementation of the non-inverted function (g) of the aforementioned second algorithm (A2) are recorded.

The apparatus (2) is in a functional state, and the authorized entity issues the card (1), thus personalized, to an owner by assigning him the confidential code (C1), which the owner must keep secret. It will be understood that the secret key (S) is not divulged to the owner of the card and is known only to the authorized entity.

The phase of recognition of a confidential code assigned in this way to the holder of a card is performed in the following manner.

Once the card (1) is coupled with the apparatus (2), the cardholder enters a confidential code (C1) to the keyboard (20) of the apparatus (2). This code (C1) is then combined with the datum (E) prerecorded in the memory (M2) of the apparatus (2).

Generally, this combination comprises applying the non-inverted function (g) embodied by the program (P22) of the second invertible algorithm (A2), which for example is of the same type as the algorithm (A1).

The processing circuits (T2) execute this program (P22), which takes into account the datum (E) and the confidential code (C1) entered at the keyboard (20), to yield an enciphered message such that:

$$M = g(E, C1)$$

This message M is then transmitted to the card (1) via the transmission line (L). The confidential code (C1) entered at the keyboard is embedded in the message (M) and accordingly is well protected during its transmission. The first operation performed on the card (1) is to apply the inverse function $(g^{-1})$ of the second algorithm (A2) to the input message (M).

More precisely, the processing circuits (T1) of the card (1) execute a program (P12) which is the implementation of the inverse function (g$^{-1}$), and which has been prerecorded in the zone (Z1) of the memory (M1) of the card (1) during the initializing phase. This program (P12) takes into account the message (M) and the reference confidential code (C1) prerecorded in the memory (M1) by the authorized entity prior to issuing the card. The execution of this program yields a datum (E') such that:

$$E' = g^{-1}(M, C1).$$

the code (C1) entered at the keyboard 20 and the reference code (C1) are identical, the datum (E') will be identical to the foregoing datum (E). The second operation performed by the card (1) is to apply the inverse function (f$^{-1}$) of the first algorithm (A1) to the datum (E').

More precisely, the processing circuits (T1) execute the program (P11) prerecorded in the memory (M1) of the card (1) during the initializing phase. This program (P11) takes into account the datum (E'), the secret key (S) and the parameter (Cu) prerecorded in the card (1), in order to arrive at a result (R'k) such that:

$$R'k = f^{-1}(E', S, Cu)$$

Once the result (R'k) has been calculated, the card verifies that this result satisfies a predetermined equation, to prove that the two codes (C1) are identical, and that the carrier of the card (1) presented to the apparatus (2) is indeed the owner of the card (1).

Because of the use of the invertible algorithm, the result (R'k) must be identical to the predetermined result (Rk) which made it possible to calculate the original datum (E), naturally on the condition that the codes (C1) are identical.

The result (R'k) must satisfy the same equation as that satisfied by the result (Rk), such that:

$$R'k = R'k1, R'k2, R'k3$$

with $R'k1 = R'k2 = ad\ Cu$ where (ad Cu) is the memory address at which the parameter (Cu) is recorded in the zone (Z2) of the memory (M1) of the card (1).

Thus the holder of the card (1) will not be recognized as its owner, if the code (C1) entered at the keyboard (20) of the apparatus (2) is not identical to the code (C1) prerecorded in the card (1). In fact, if these two codes are different, the card (1), by combining the message (M) received and the code (C1), will not retrieve the original datum (E), and the result (R'k) calculated by the card (1) will not be able to satisfy the predetermined equation defined on the basis of the original datum (E).

According to a major characteristic of the invention, the time for processing by the card (1) of an enciphered massage (M) is then variable from one confidential code (C1) to another. To this end, it is sufficient for at least one of the algorithms (A1, A2) to take into account a parameter that corresponds to a portion of the confidential code (C1) to be processed. This parameter may for example determine the number of times that a program loop in the algorithm can be traversed.

By way of example and in accordance with a particular kind of exemplary embodiment of the invention, the functions (g) and (g$^{-1}$) are identical and are each embodied by an EXCLUSIVE-OR function.

The principle on which the invention is based, as shown in FIG. 1, can be improved by using a variable datum (E) for which the message (M) communicated to the card will never be the same for the same confidential code entered into the apparatus.

Figure 2:
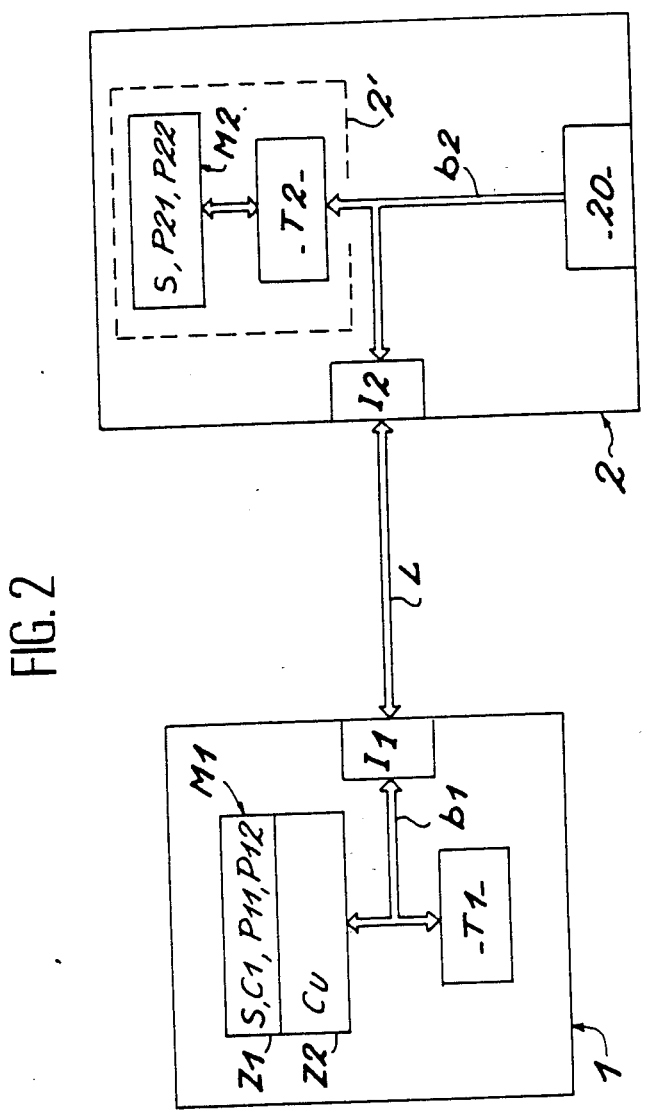
FIG. 2 illustrates a variant of this method.

In order for this message (M) to be variable, it is sufficient for the parameter (Cu) to be variable for one and the same card (1). In this variant, shown in FIG. 2, the zone (Z2) of the memory (1) of the card (1) is then a monitoring zone, such that each time the card (1) is used, at least one bit of this zone is modified. The parameter (Cu) is then the memory word of the zone (Z2) that contains the last bit modified the last time the card (1) was used.

Since the parameter (Cu) is variable and specific to each card, the apparatus (2) must calculate the datum (E) each time, such that:

$$E = f(Rk, S, Cu).$$

To perform this calculation, the memory (M2) of the apparatus (2) must include a program (P11) corresponding to the function (f) of the algorithm (A1) mentioned above and the secret key (S). Furthermore, the apparatus each time defines a result (Rk) such that:

$$Rk = Rk1, Rk2, Rk3$$

with $Rk1 = Rk2 = ad(Cu)$

Naturally the card (1) communicates the parameter (Cu) and its address (ad) to the apparatus (2) in order to enable calculation of the datum (E). The datum (E) is then processed as in the foregoing exemplary embodiment. Just as the data that are secret in nature are protected within the card, protection must also be taken for the data of a secret nature recorded in the memory (M2) of the apparatus (2). One solution for this comprises the use of algorithms (A1, A2) of the type having a public key. Another solution comprises integrating the memory (M2) and the processing circuits (T2) in semiconductor chips that are either separate or not and are assembled in a package (2'). Advantageously, these packages are designed in accordance with U.S. Pat. Nos. 4,211,919 and 4,382,279 of the present applicant and are assembled in a portable carrier such as a standardized memory card identical with the card (1).

In the foregoing example, the result (Rk) is such that the fields (Rk1) and (Rk2) are identical, and each is equal to the memory address of the parameters (Cu).

It is understood that this condition may be of any other kind and need not necessarily involve the address of the parameter (Cu).

The examples described relate to the recognition of the confidential code (or PIN: personal identification number), but the method applies more generally to the recognition of an authorizing datum external to the card (1) and which must be authenticated by the card in order to undertake dialogue between the card (1) and the apparatus (2).

We claim:

1. A method for authentication of an authorizing datum by a portable object including processing circuits, said portable object being coupled with an apparatus for furnishing services, comprising:

in the apparatus, fashioning an enciphered message by application of an enciphering function of an invertible algorithm used by a program recorded in a memory of the apparatus and executed by the processing circuits, said program employing at least an authorizing datum entered into said apparatus and one predetermined datum (E), and transmitting this message to the portable object, and in the portable object, applying to the message received a deciphering function of the algorithm by executing a program recorded in the memory of the portable object, said program employing a reference authorizing datum to yield a datum (E′), and verifying that this datum (E′) is coherent with the datum (E).

2. A method as defined by claim 1, characterized in that it comprises predetermining the datum (E) based on at least one result (Rk), one parameter (Cu) specific to the card (1), and one secret key (S).

3. A method as defined by claim 2, characterized in that it comprises calculating the datum (E) by applying the function of enciphering an invertible algorithm (A1) such that:

$$E = f(Rk, S, Cu).$$

4. A method as defined by claim 3, characterized in that it comprises, in order to verify the coherence of the datum (E′) calculated by the card (1), applying to this datum the enciphering function of the algorithm (A1) to obtain a result (R′k) such that:

$$R'k = f^{-1}(E', S, Cu)$$

and verifying that this result (R′k) is coherent with the result (Rk).

5. A method as defined by claim 2, characterized in that it comprises giving to the result (Rk) the following form:

$$Rk = Rk1, Rk2, Rk3$$

with at least Rk1 or Rk2 or Rk3 being equal to the memory address of the parameter (Cu).

6. A method as defined by claim 2, characterized in that it comprises using a variable parameter (Cu) in order to vary the datum (E) and the message (M).

7. A method as defined by claim 6, characterized in that it comprises reserving a memory zone (Z2) of the memory (M1) of the card (1), modifying the state of at least one bit of this zone after each use of the card (1), and using as the parameter (Cu) the memory word of this zone (Z2) that contains the bit most recently modified.

8. A method as defined by claim 1, characterized in that the algorithms (A1, A2) are algorithms having a public key.

9. A method as defined by claim 3, characterized in that it comprises giving to the result (Rk) the following form:

$$Rk = Rk1, Rk2, Rk3$$

with at least RK1 or Rk2 or Rk3 being equal to the memory address of the parameter (Cu).

10. A method as defined by claim 4, characterized in that it comprises giving to the result (Rk) the following form:

$$Rk = Rk1, Rk2, Rk3$$

with at least Rk1 or Rk2 or Rk3 being equal to the memory address of the parameter (Cu).

11. A method as defined by claim 3, characterized in that it comprises using a variable parameter (Cu) in order to vary the datum (E) and the message (M).

12. A method as defined by claim 4, characterized in that it comprises using a variable parameter (Cu) in order to vary the datum (E) and the message (M).

13. A method as defined by claim 5, characterized in that it comprises using a variable parameter (Cu) in order to vary the datum (E) and the message (M).

14. A method as defined by claim 2, characterized in that the algorithms (A1, A2) are algorithms having a public key.

15. A method as defined by claim 3, characterized in that the algorithms (A1, A2) are algorithms having a public key.

16. A method as defined by claim 4, characterized in that the algorithms (A1, A2) are algorithms having a public key.

17. A method as defined by claim 5, characterized in that the algorithms (A1, A2) are algorithms having a public key.

18. A method as defined by claim 6, characterized in that the algorithms (A1, A2) are algorithms having a public key.

19. A method as defined by claim 7, characterized in that the algorithms (A1, A2) are algorithms having a public key.

20. A method for authentication of an authorizing datum by a portable object including processing circuits, said portable object being coupled with an apparatus for furnishing services, comprising:

in the apparatus, fashioning an enciphered message by application of an enciphering function of an invertible algorithm used by a program recorded in a memory of the apparatus and executed by the processing circuits, said program employing at least an authorizing datum entered into said apparatus and one predetermined datum (E), wherein said predetermined datum is calculated based on a set of predetermined parameters common to all portable objects to be coupled with said apparatus, said predetermined datum being stored in a memory of said apparatus after said calculation is performed, said set of parameters also being stored in a memory of said portable object in an initialization of said portable object, and transmitting this message to the portable object, and in the portable object, applying to the message received a deciphering function of the algorithm by executing a program recorded in the memory of the portable object, said program employing a reference authorizing datum to yield a datum (E′), and verifying that this datum (E′) is coherent with the datum (E).

* * * * *